United States Patent
Sasaki et al.

(10) Patent No.: US 12,258,808 B2
(45) Date of Patent: Mar. 25, 2025

(54) SLIDE DOOR DRIVING DEVICE

(71) Applicant: MITSUI KINZOKU ACT CORPORATION, Yokohama (JP)

(72) Inventors: Kazuyuki Sasaki, Yokohama (JP); Shinichiro Kita, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 0 days.

(21) Appl. No.: 17/768,977

(22) PCT Filed: Nov. 2, 2020

(86) PCT No.: PCT/JP2020/041075
§ 371 (c)(1),
(2) Date: Apr. 14, 2022

(87) PCT Pub. No.: WO2021/106506
PCT Pub. Date: Jun. 3, 2021

(65) Prior Publication Data
US 2024/0102334 A1 Mar. 28, 2024

(30) Foreign Application Priority Data
Nov. 26, 2019 (JP) .................................. 2019-213129

(51) Int. Cl.
*B60J 5/04* (2006.01)
*E05F 15/643* (2015.01)
*E05F 15/662* (2015.01)

(52) U.S. Cl.
CPC .......... *E05F 15/662* (2015.01); *E05F 15/643* (2015.01)

(58) Field of Classification Search
CPC .............................. E05F 15/662; E05F 15/643
(Continued)

(56) References Cited

U.S. PATENT DOCUMENTS

| 4,640,050 A | 2/1987 | Yamagishi et al. |
| 7,434,354 B2 * | 10/2008 | Yokomori ............. E05F 15/646 |
| | | 192/114 R |

(Continued)

FOREIGN PATENT DOCUMENTS

| CN | 109757115 A * | 5/2019 | ................ B60J 5/04 |
| JP | 5-36058 Y2 | 9/1993 | |

(Continued)

OTHER PUBLICATIONS

International Search Report dated Dec. 28, 2020, issued in counterpart International Application No. PCT/JP2020/041075 (2 pages).

*Primary Examiner* — Jerry E Redman
(74) *Attorney, Agent, or Firm* — WHDA, LLP

(57) ABSTRACT

The size of a driving portion for a sliding door is reduced. Drive mechanism drives sliding door that can move along rail provided in a lower part of a vehicle. Drive mechanism comprises: door opening and closing cables each having first end that is fixed to sliding door; and driving portion to which a second end of door opening cable and a second end of door closing cable are fixed, wherein driving portion drives door opening cable and door closing cable. Driving portion includes: door opening drum to which the second end of door opening cable is fixed and onto which door opening cable is wound; and door closing drum to which the second end of door closing cable is fixed and onto which door closing cable is wound. Door opening drum and door closing drum are arranged along rail between a front end and a rear end of rail.

8 Claims, 11 Drawing Sheets

(58) Field of Classification Search
USPC .......................................................... 49/360
See application file for complete search history.

(56) References Cited

U.S. PATENT DOCUMENTS

| | | | | |
|---|---|---|---|---|
| 7,627,990 | B2* | 12/2009 | Yokomori | ............. E05F 15/646 |
| | | | | 49/360 |
| 7,774,985 | B2* | 8/2010 | Miyagawa | ............. H02K 7/116 |
| | | | | 49/360 |
| 7,854,093 | B2* | 12/2010 | Yoshida | ................ E05F 15/646 |
| | | | | 49/360 |
| 9,476,245 | B2* | 10/2016 | Hansen | ............... E05D 15/1047 |
| 2003/0089042 | A1 | 5/2003 | Oberheide et al. | |
| 2005/0102905 | A1* | 5/2005 | Ichinose | ............... E05F 15/627 |
| | | | | 49/360 |
| 2010/0154313 | A1* | 6/2010 | Elliott | ................... E05F 15/646 |
| | | | | 49/360 |
| 2016/0298372 | A1 | 10/2016 | Seto et al. | |
| 2021/0213811 | A1 | 7/2021 | Ishigaki | |

FOREIGN PATENT DOCUMENTS

| | | | | | |
|---|---|---|---|---|---|
| JP | 4828768 | B2 | | 11/2011 | |
| JP | 2016-37741 | A | | 3/2016 | |
| JP | 2019-44533 | A | | 3/2019 | |
| JP | 2019044533 | A | * | 3/2019 | ............... B60J 5/04 |
| JP | 2019044534 | A | * | 3/2019 | |
| KR | 10-1738327 | B1 | | 5/2017 | |

* cited by examiner

SLIDE DOOR DRIVING DEVICE

FIELD OF THE INVENTION

The present application is based on, and claims priority from, JP2019-213129, filed on Nov. 26, 2019, and the disclosure of which is hereby incorporated by reference herein in its entirety.

The present invention relates to a drive mechanism for a sliding door.

DESCRIPTION OF THE RELATED ART

A drive mechanism to drive a sliding door of a vehicle by a motor is known. In the drive mechanism disclosed in JP2019-44533, a driving portion is provided near the center rail of a sliding door. The driving portion has a motor, reduction gears, a door opening drum for taking up a door opening cable and a door closing drum for taking up a door closing cable. The reduction gears reduce the rotation speed of the motor and transmits the driving force of the motor both to the door opening drum and to the door closing drum. The rotation axes of the motor, the door opening drum, and the door closing drum extend in the horizontal direction and in parallel with each other, and the door opening drum and the door closing drum are arranged side by side. Therefore, the size of the driving portion in the vehicle width direction can be reduced.

BRIEF DESCRIPTION OF THE DRAWINGS

The driving portion is normally arranged near the center rail or the lower rail of a sliding door. When the driving portion is arranged near the lower rail, the driving portion is often arranged in the side sill of the vehicle. However, the space in the side sill is small, and the dimension in the vehicle width direction is limited.

The present invention aims at providing a drive mechanism for a sliding door having a driving portion that is arranged near the lower rail of the sliding door and that can be reduced in size in the vehicle width direction.

The present invention relates to a drive mechanism for driving a sliding door, wherein the sliding door can move along a rail that is provided in a lower part of a vehicle. The drive mechanism comprises: a door opening cable and a door closing cable each having a first end that is fixed to the sliding door; and a driving portion to which a second end of the door opening cable and a second end of the door closing cable are fixed, wherein the driving portion drives the door opening cable and the door closing cable. The driving portion includes: a door opening drum to which the second end of the door opening cable is fixed and onto which the door opening cable is wound; and a door closing drum to which the second end of the door closing cable is fixed and onto which the door closing cable is wound. The door opening drum and the door closing drum are arranged along the rail between a front end and a rear end of the rail.

According to the present invention it is possible to provide a drive mechanism for a sliding door having a driving portion that is arranged near the lower rail of the sliding door and that can be reduced in size in the vehicle width direction.

The above and other objects, features and advantages of the present invention will become apparent from the following description with reference to the accompanying drawings which illustrate examples of the present invention.

BRIEF DESCRIPTION OF THE DRAWINGS

Figure 1A:
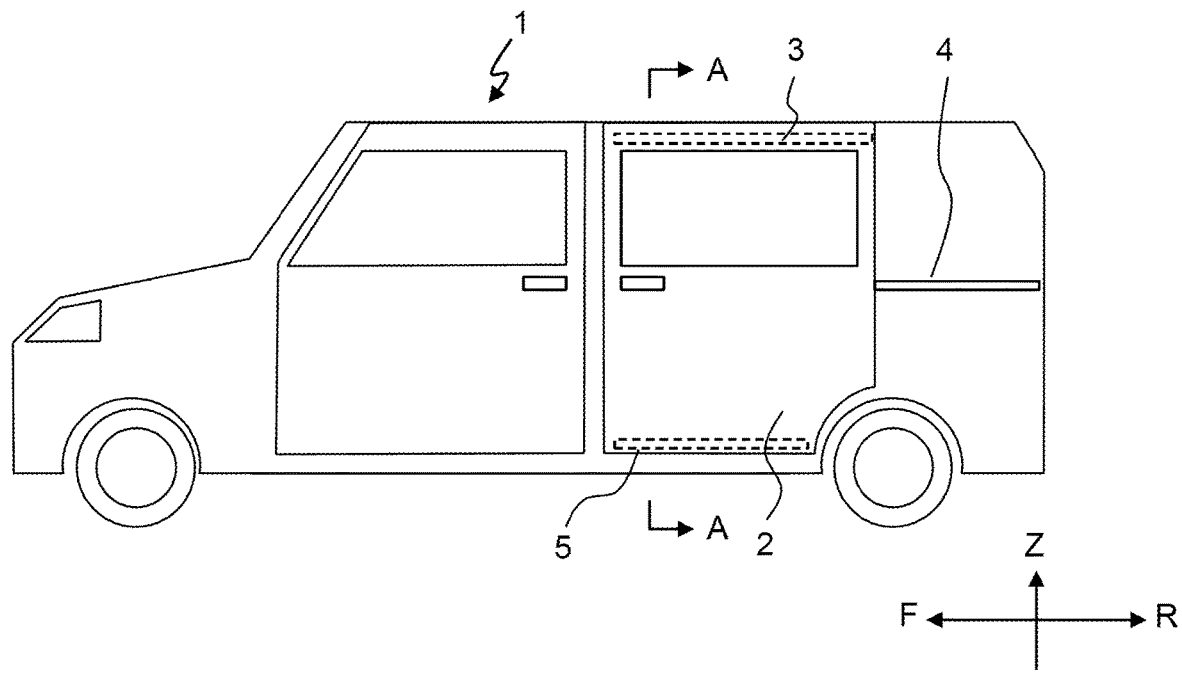
Figure 1B:
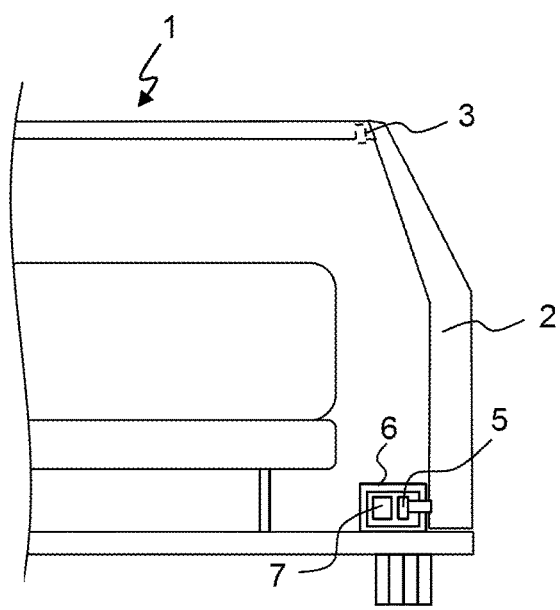
Figure 1B:
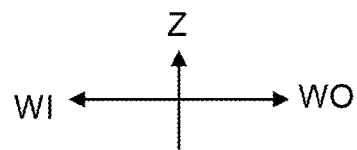
Figure 2:
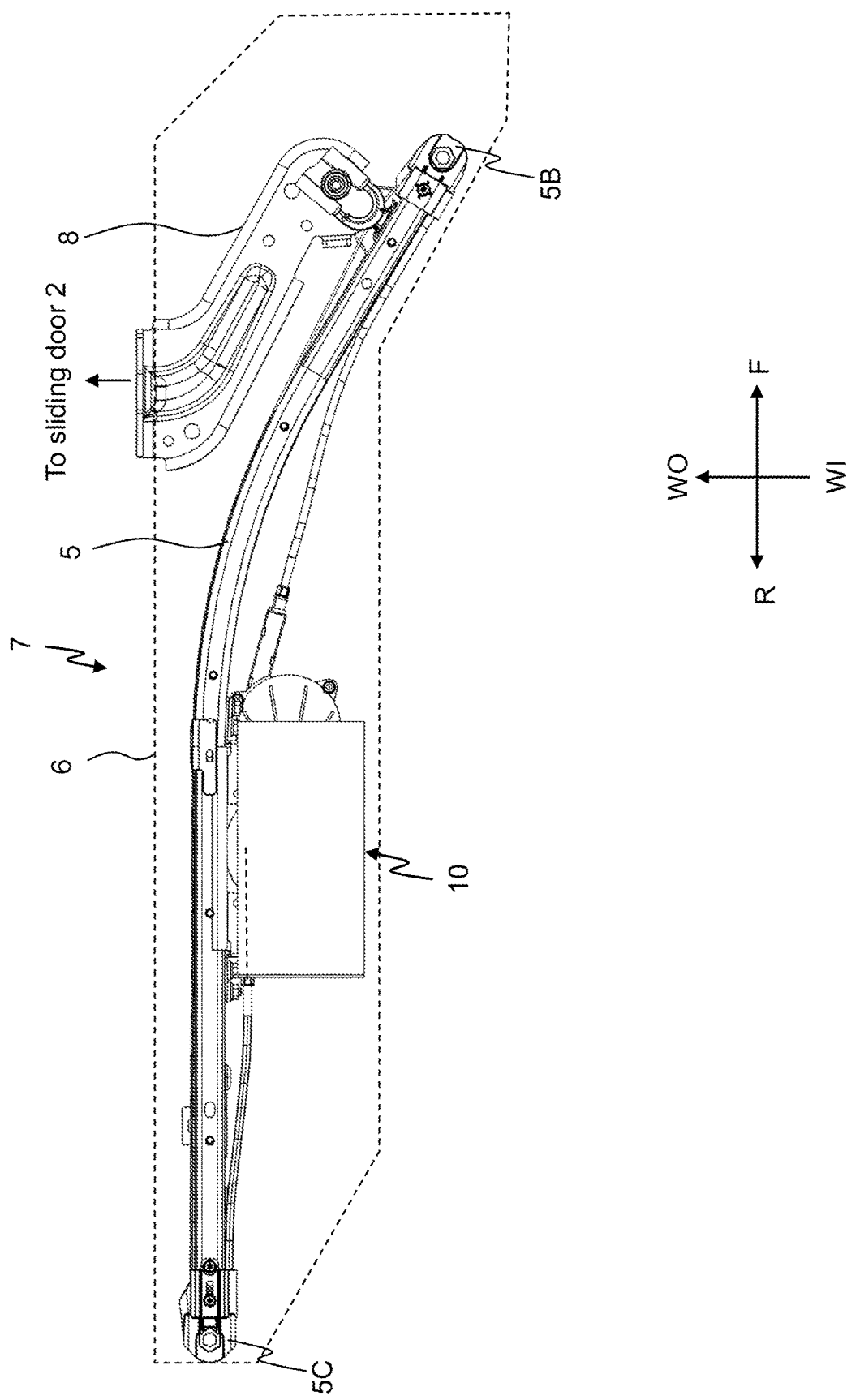
Figure 3A:
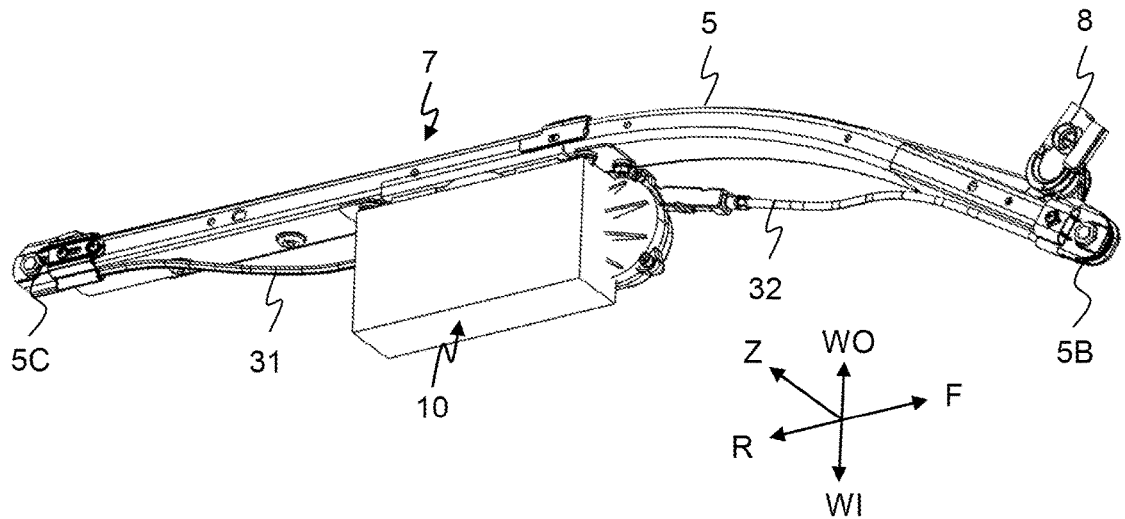
Figure 3B:
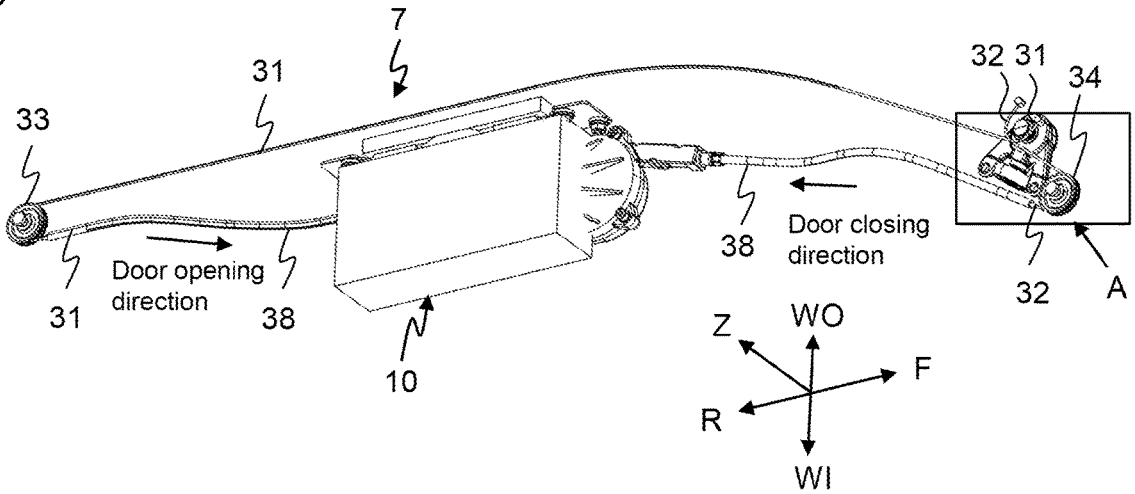
Figure 4A:
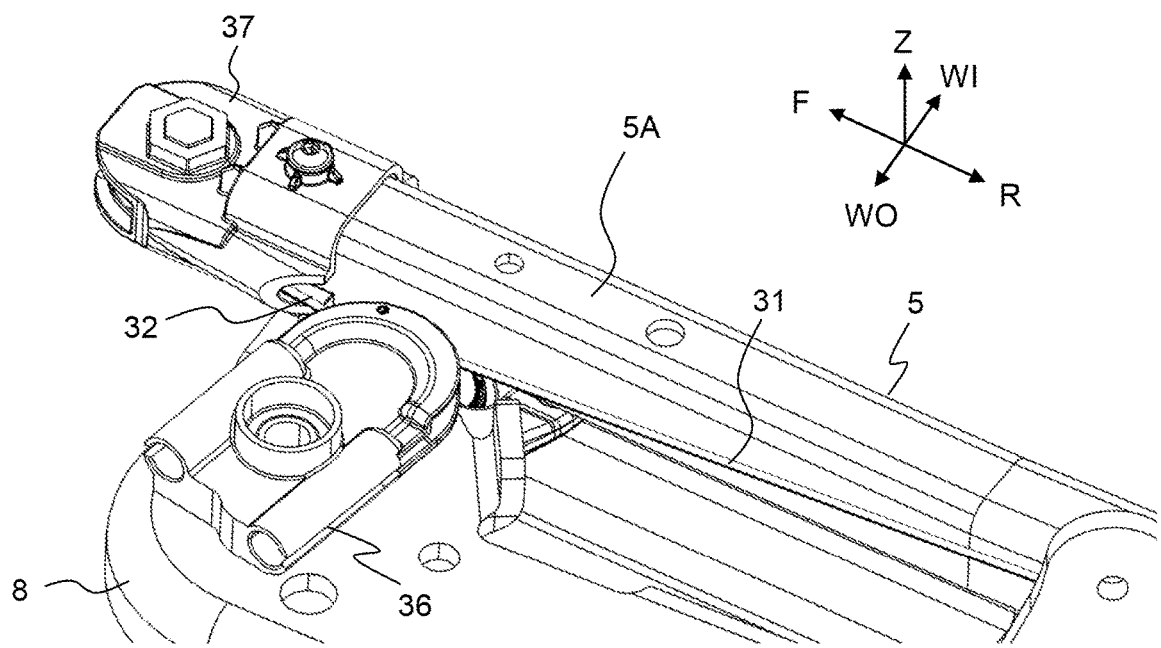
Figure 4B:
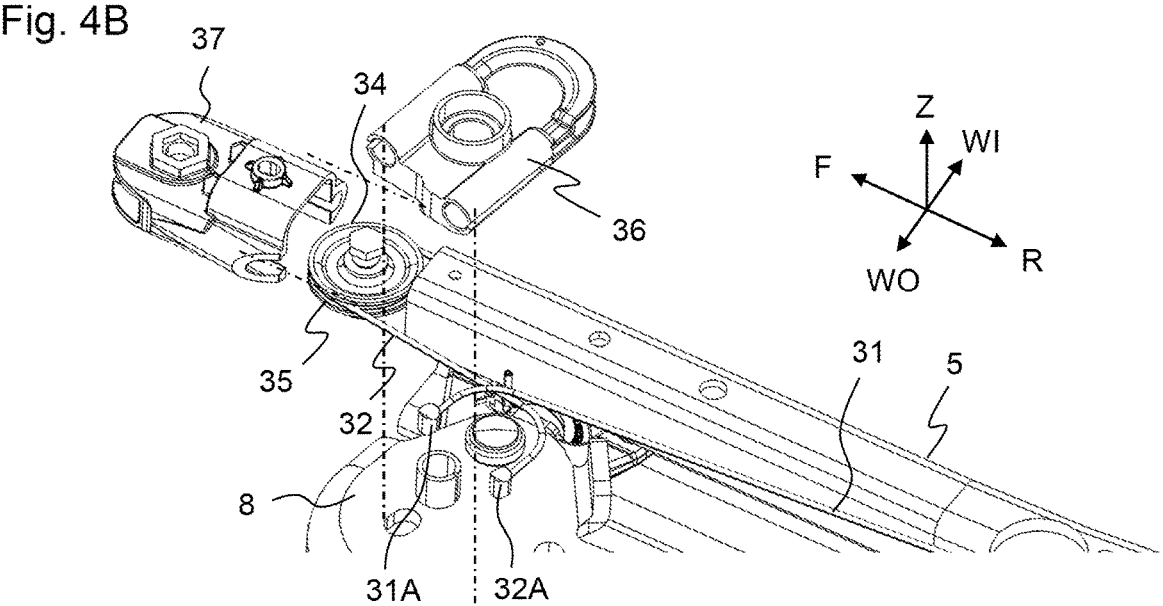
Figure 5:
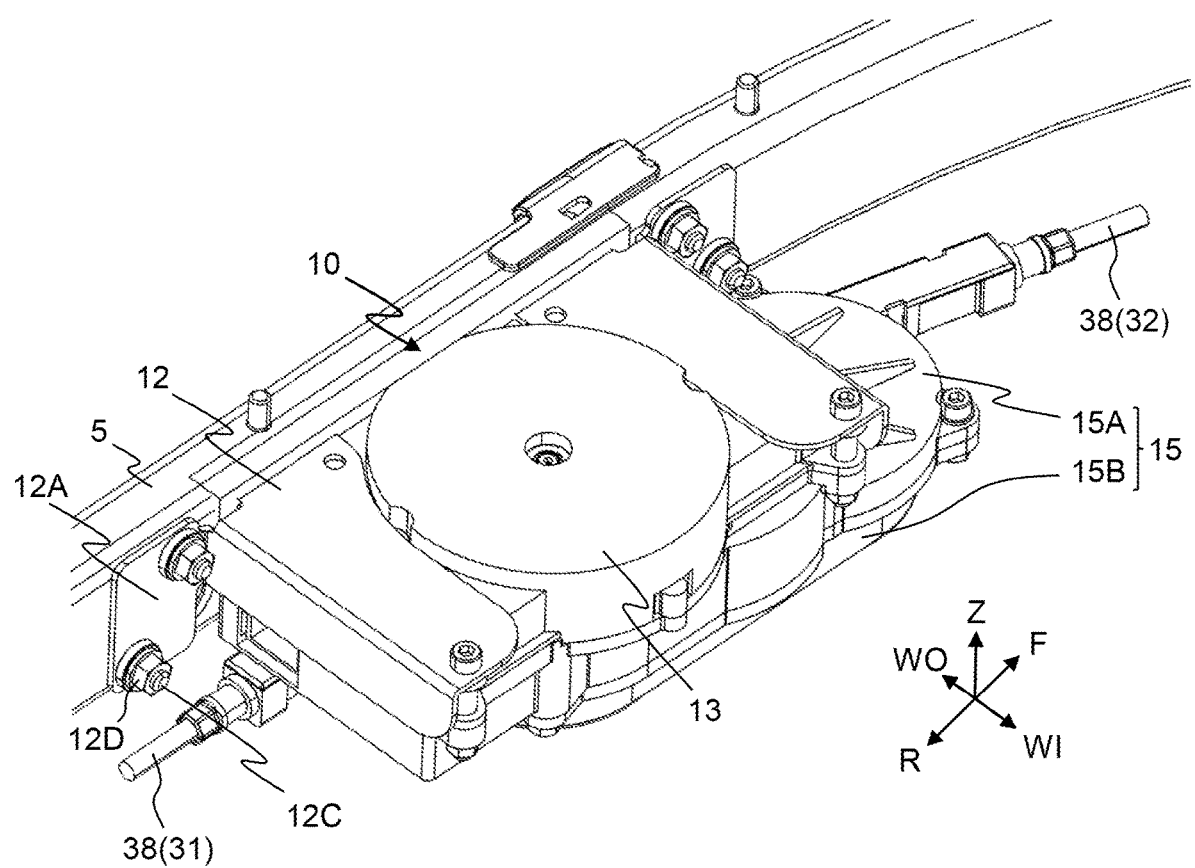
Figure 6:
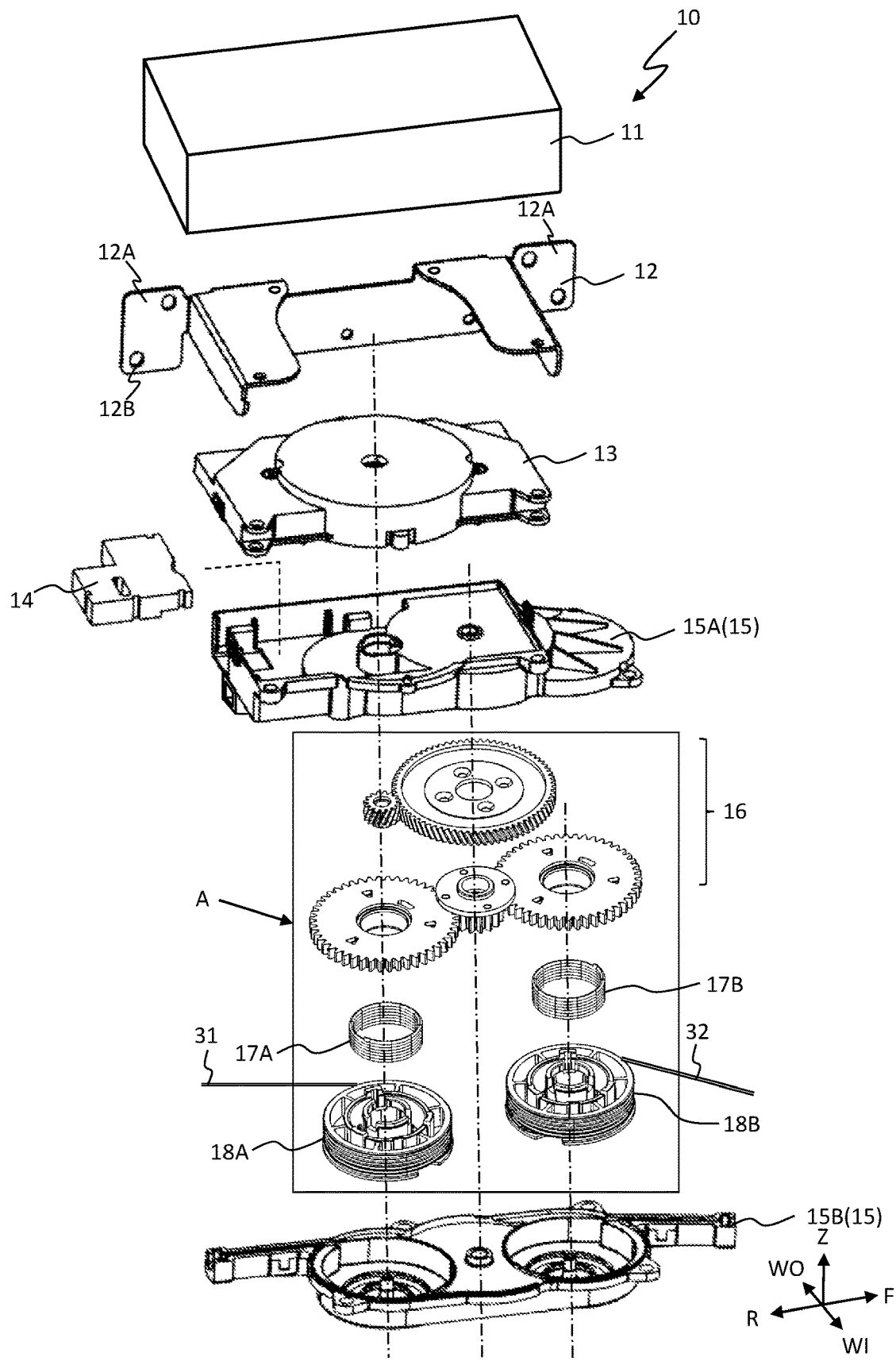
Figure 7:
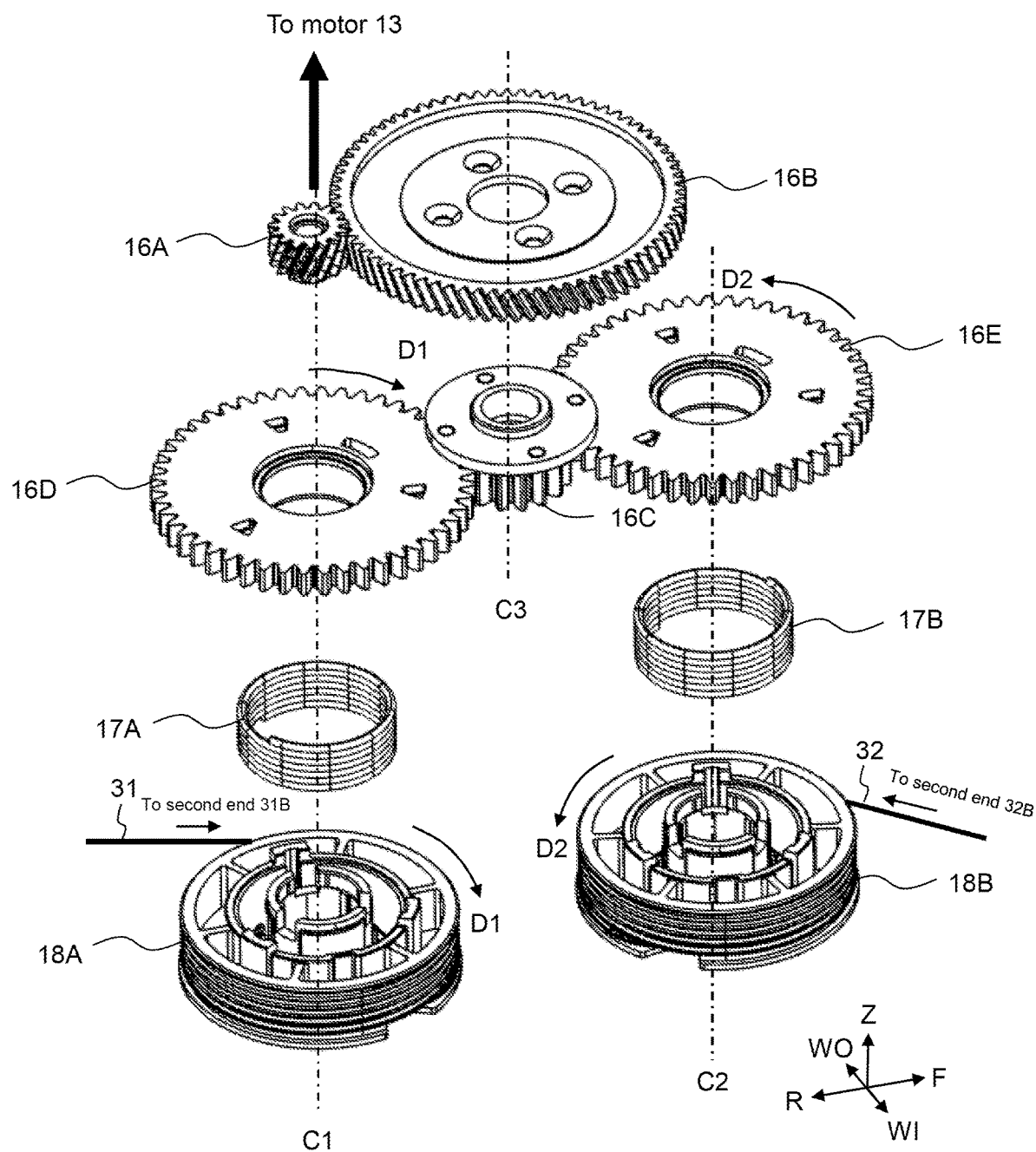
Figure 8:
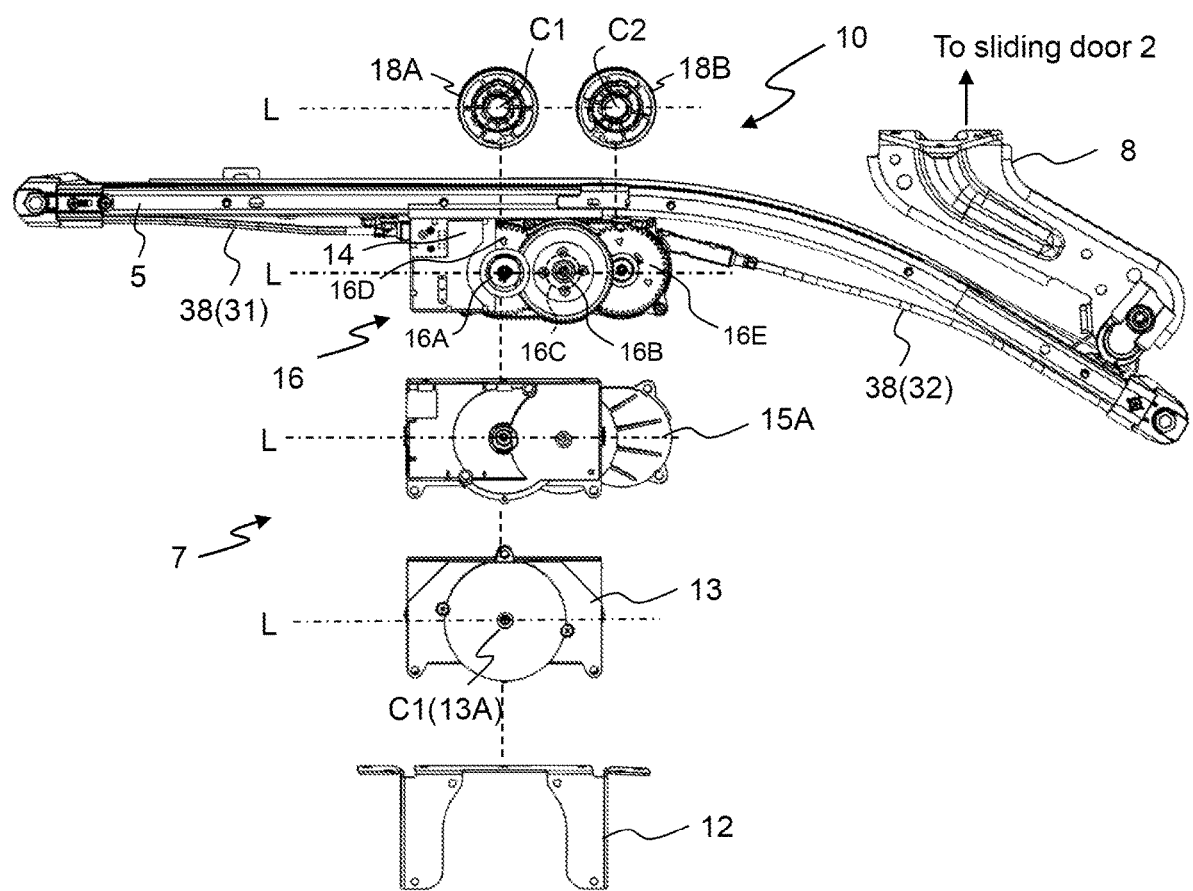
Figure 8:
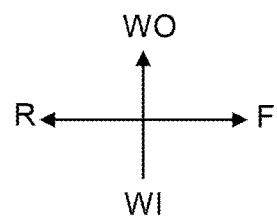
Figure 9:
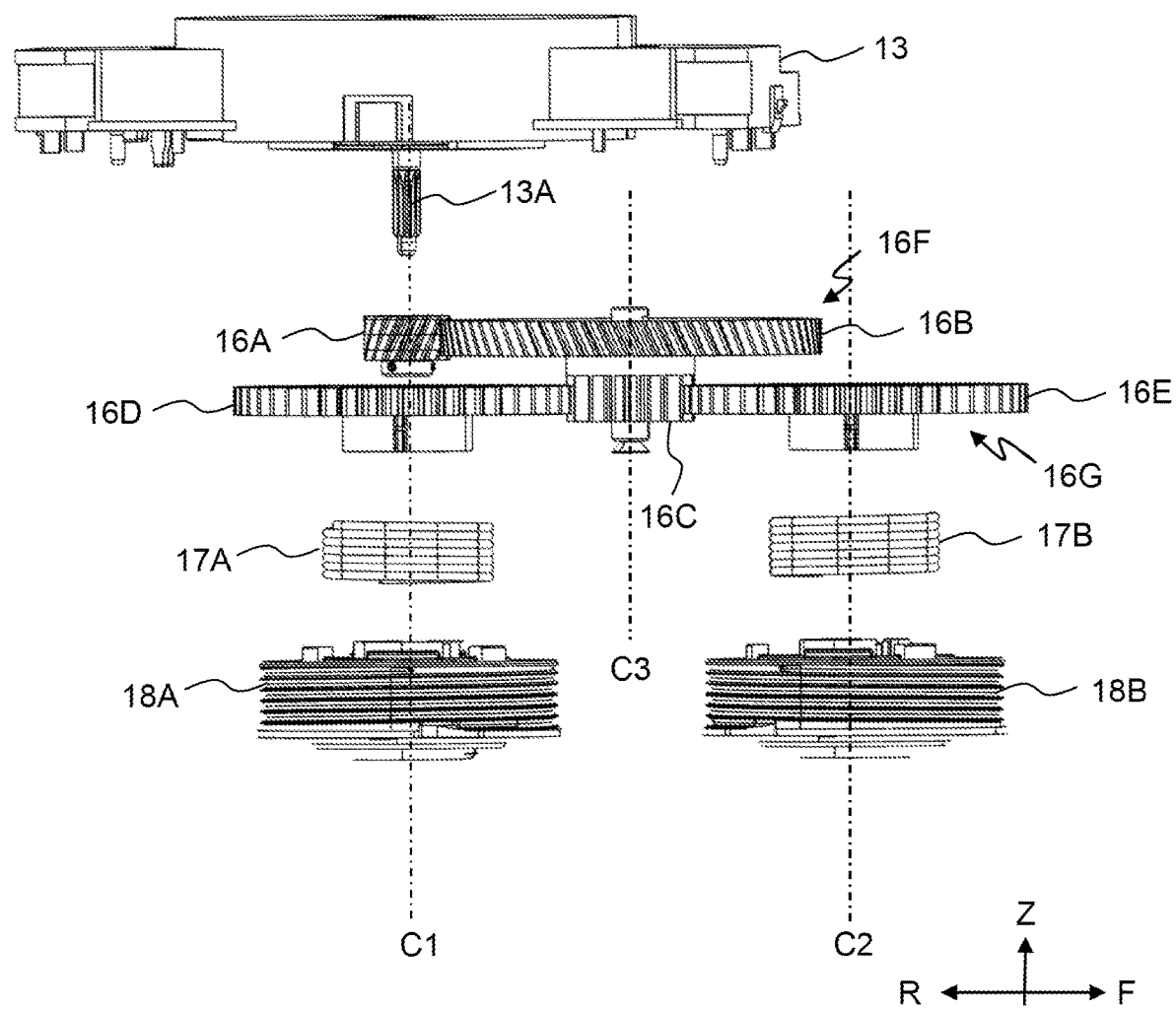
Figure 10A:
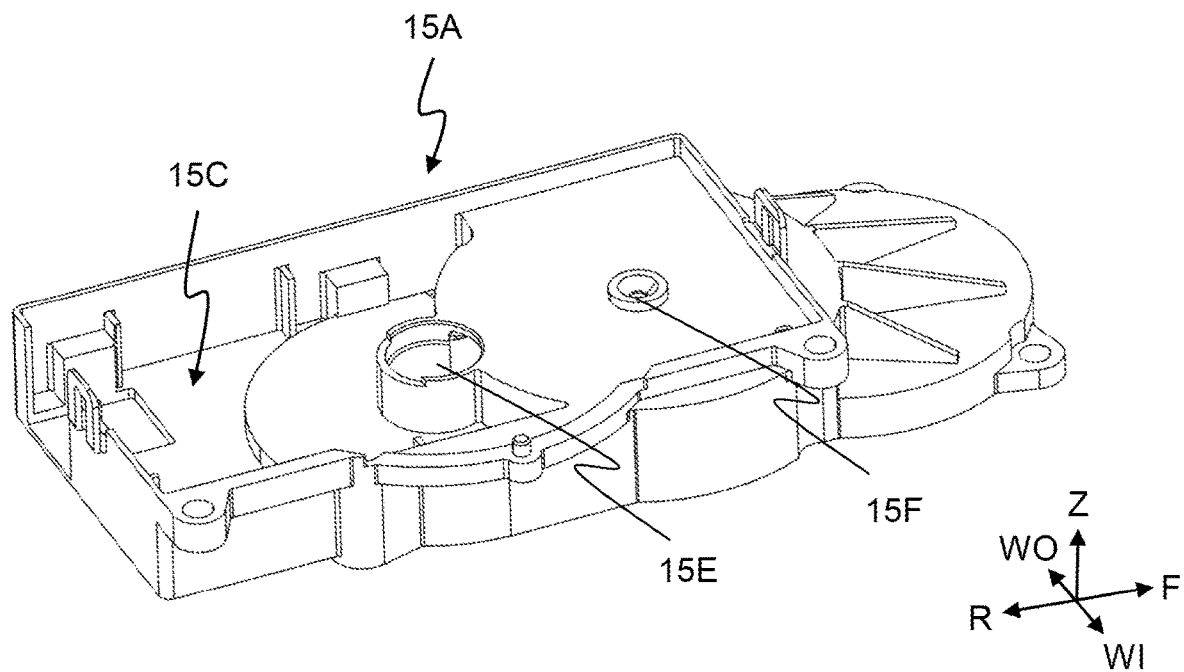
Figure 10B:
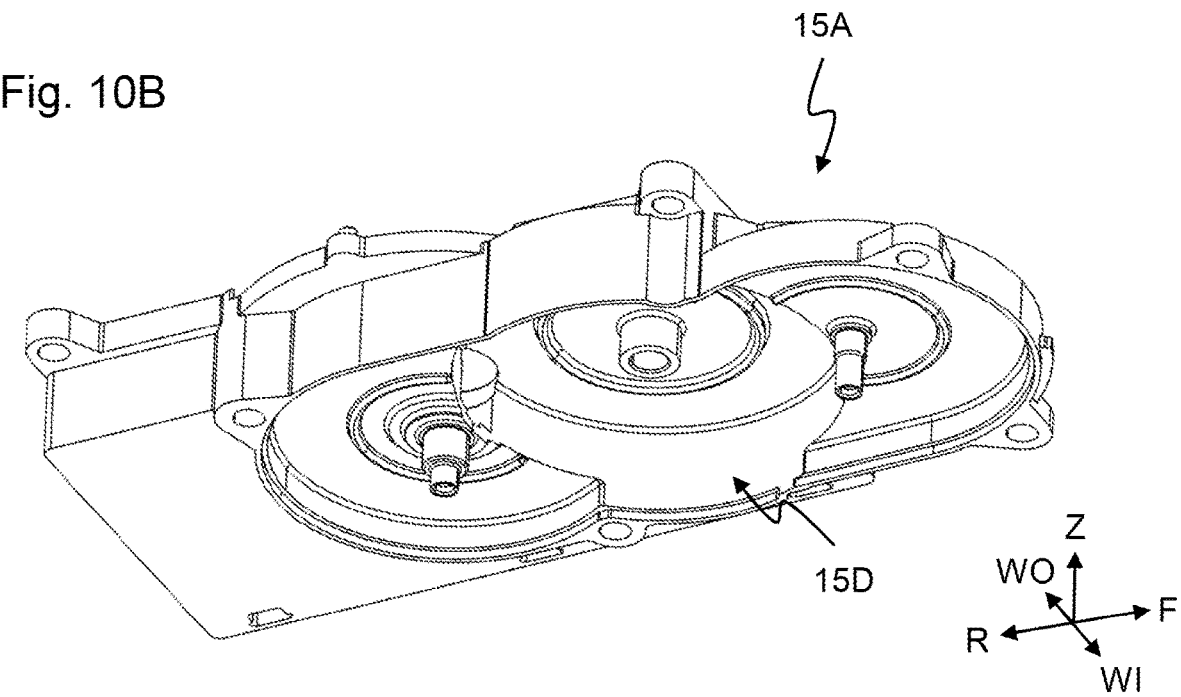
Figure 11A:
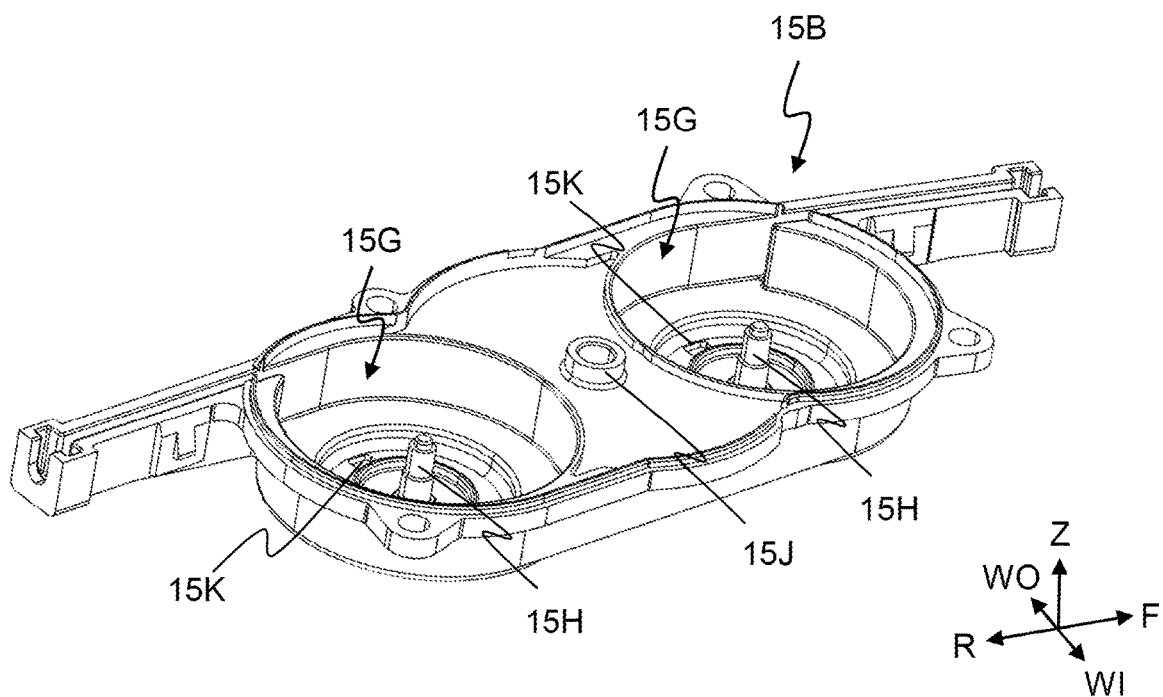

FIG. 1A is a side view of a vehicle to which a drive mechanism is applied;

FIG. 1B is a sectional view of the vehicle shown in FIG. 1A;

FIG. 2 is a top view of the drive mechanism and the lower rail;

FIG. 3A is a perspective view of the drive mechanism and the lower rail;

FIG. 3B is a perspective view of the drive mechanism;

FIG. 4A is a perspective view of the end of the door opening cable, the end of the door closing cable, and the door opening pulley;

FIG. 4B is a view in which the cable end cover member and the pulley cover member are removed in FIG. 4A;

FIG. 5 is a perspective view of the driving portion;

FIG. 6 is an exploded perspective view of the driving portion;

FIG. 7 is an enlarged view of portion A in FIG. 6;

FIG. 8 is a top view of the drive mechanism;

FIG. 9 is a partial side view of the driving portion;

FIG. 10A is a perspective view of the upper housing, as seen from above;

FIG. 10B is a perspective view of the upper housing, as seen from below;

FIG. 11A is a perspective view of the lower housing, as seen from above; and

Figure 11B:
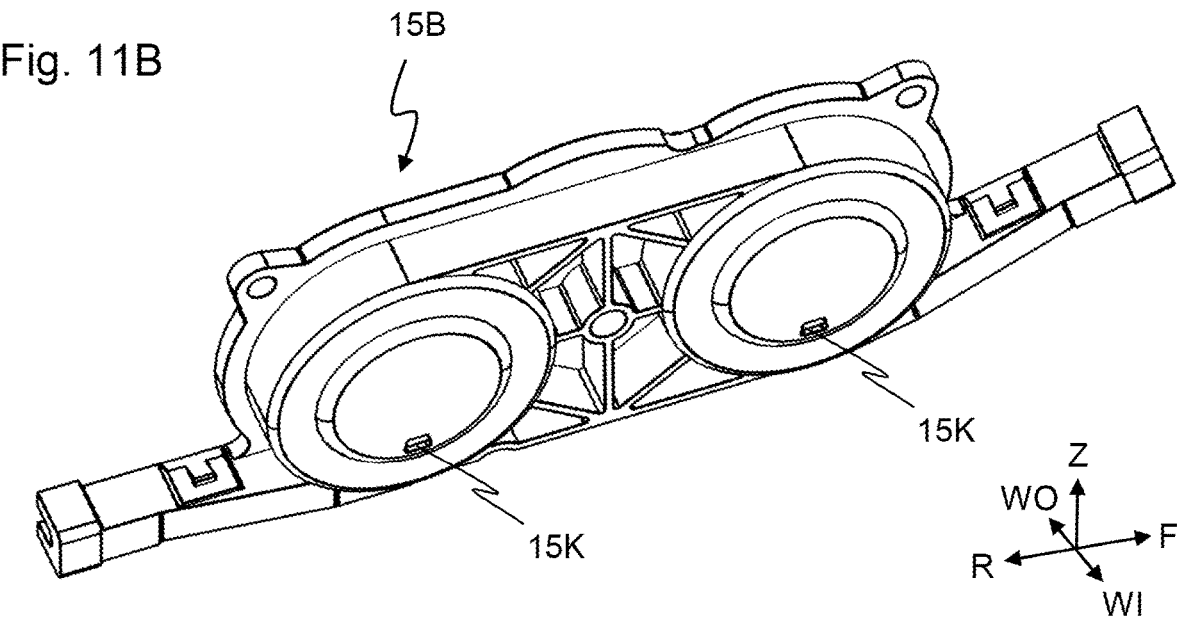

FIG. 11B is a perspective view of the lower housing, as seen from below.

DESCRIPTION OF EMBODIMENTS

With reference to the drawings, an embodiment of the drive mechanism for a sliding door of the present invention will be described. In each drawing, F shows the frontward direction of the vehicle, R shows the rearward direction of the vehicle, Z shows the upward direction in the vertical direction, WI shows the inward direction in the vehicle width direction, and WO shows the outward direction in the vehicle width direction.

FIG. 1A shows a side view of a vehicle to which the drive mechanism is applied, and FIG. 1B shows a sectional view of FIG. 1A taken along line A-A. Drive mechanism 7 is mounted near sliding door 2, which is a rear door of vehicle 1. Drive mechanism 7 drives sliding door 2 by means of the power of motor 13 in order to automatically open and close sliding door 2. Sliding door 2 is supported by upper rail 3 provided in the upper part of vehicle 1, center rail 4 provided in the middle part of vehicle 1 in the height direction, and lower rail 5 provided in the lower part of vehicle 1. When sliding door 2 is opened and closed, sliding door 2 moves while being guided by these rails 3 to 5. Side sill 6 is provided below the door opening that is opened and closed by sliding door 2. Lower rail 5 and drive mechanism 7 are accommodated in side sill 6. Vehicle 1 has holding means (not illustrated) that holds sliding door 2 at the fully opened position and at the fully closed position.

FIG. 2 is a top view of drive mechanism 7 and lower rail 5. The broken line conceptually shows the inner space of side sill 6. FIG. 3A is a perspective view of drive mechanism 7 and lower rail 5 as seen from above, and FIG. 3B is a perspective view of drive mechanism 7 (that is, a view in which lower rail 5, cable end cover member 36, and pulley cover member 37 shown in FIG. 3A have been omitted) as seen from above. Support frame 8 is connected to sliding door 2. Support frame 8 has a travelling roller (not illustrated) that rolls in lower rail 5. Sliding door 2 is stably moved along lower rail 5 by the rolling movement of travelling rollers in lower rail 5. Lower rail 5 has a shape that matches the movement of sliding door 2 during opening and closing operations. Specifically, lower rail 5 extends substantially in the front-rear direction in the section between the middle portion and the rear portion of the vehicle, and curves inward toward the front end in the front portion.

Drive mechanism 7 has driving portion 10, door opening cable 31, door closing cable 32, door opening pulley 33, and door closing pulley 34. Driving portion 10 is an assembly in which motor 13, reduction gears 16, door opening drum 18A, door closing drum 18B, control device 14, and so on are integrated. Driving portion 10 drives door opening cable 31 and door closing cable 32. First end 31A of door opening cable 31 and first end 32A of door closing cable 32 are fixed to sliding door 2 via support frame 8, and second end 31B of door opening cable 31 and second end 32B of door closing cable 32 are connected to driving portion 10. Door opening cable 31 and door closing cable 32 extend in opposite directions from driving portion 10. Door opening cable 31 and door closing cable 32 transmit the driving force generated by driving portion 10 to sliding door 2. Door opening pulley 33 and door closing pulley 34 also have the function of changing the directions of door opening cable 31 and door closing cable 32, respectively. These elements will now be described in more detail.

Door opening cable 31 and door closing cable 32 are each formed of, for example, a stranded wire made of stainless steel. FIGS. 4A and 4B are enlarged views of portion A in FIG. 3B, as seen from outside to inside in the vehicle width direction. FIG. 4A shows a state in which cable end cover member 36 and pulley cover member 37 are mounted, and FIG. 4B shows a state in which cable end cover member 36 and pulley cover member 37 are removed. The end regions of door opening cable 31 and door closing cable 32 are arranged such that these cables 31, 32 cross each other and first end 31A of door opening cable 31 and first end 32A of door closing cable 32 are fixed by support frame 8 and cable end cover member 36. As shown in FIG. 3B, door opening cable 31 and door closing cable 32 are accommodated in outer casing 38 in the region inside lower rail 5 in the vehicle width direction and are exposed in the region outside lower rail 5 in the vehicle width direction. Due to the positional relationship between door opening and door closing drums 18A, 18B (described later) and door opening and door closing pulleys 33, 34, door opening cable 31 and door closing cable 32 incline upward in an S-shaped pattern from driving portion 10 toward door opening and door closing pulleys 33, 34.

Door closing pulley 34 is attached to front end 5B of top surface 5A of lower rail 5. Door closing pulley 34 is covered by pulley cover member 37. Door closing pulley 34 has groove 35 that engages door closing cable 32. Door closing pulley 34 supports door closing cable 32 so as to allow door closing cable 32 to slide in groove 35 when the direction of door closing cable 32 changes. That is, door closing cable 32 extends from driving portion 10 toward the vehicle front portion inside lower rail 5, reverses its direction 180 degrees at door closing pulley 34, then extends toward the vehicle rear portion outside lower rail 5, and terminates at the support portion of support frame 8. Similarly, door opening pulley 33 is attached to rear end 5C of top surface 5A of lower rail 5. Door opening pulley 33 supports door opening cable 31 so as to allow door opening cable 31 to slide in groove 35 when the direction of door opening cable 31 changes. Door opening cable 31 extends from driving portion 10 toward the vehicle rear portion inside lower rail 5, reverses its direction 180 degrees at door opening pulley 33, then extends toward the vehicle front portion outside lower rail 5, and terminates at the support portion of support frame 8.

Door opening pulley 33 and door closing pulley 34 can be attached to lower rail 5 from above because they are attached to top surface 5A of lower rail 5. In general, the work of attaching pulleys 33, 34 and the work of arranging cables 31, 32 are conducted after lower rail 5 is attached to the vehicle body, and the working efficiency is therefore poor. In the present embodiment, the working efficiency is improved because this work can be performed from above. The work of arranging cables 31, 32 may be conducted after pulleys 33, 34 are attached, but this work can be performed at one time by integrating cables 31, 32 and pulleys 33, 34 into one assembly. In this case, the working efficiency is improved because this work can be also performed from above.

FIG. 5 shows a perspective view of driving portion 10, FIG. 6 shows an exploded perspective view of driving portion 10, FIG. 7 shows an enlarged view of portion A in FIG. 6, FIG. 8 shows a top view of drive mechanism 7, and FIG. 9 shows a partial side view of driving portion 10. In FIG. 8, bracket 12, motor 13, and upper housing 15A are shown below, and door opening drum 18A and door closing drum 18B are shown above for convenience, but actually, the center lines of these elements overlap each other as seen in the vertical direction. Driving portion 10 has door opening drum 18A and door closing drum 18B. Door opening drum 18A and door closing drum 18B are formed of resin. Door opening drum 18A has first rotation axis C1 that extends in the vertical direction, and door closing drum 18B has second rotation axis C2 that extends in the vertical direction. Door opening drum 18A and door closing drum 18B are rotatably supported by lower housing 15B via bearings (not illustrated). Second end 31B of door opening cable 31 is fixed to door opening drum 18A, and door opening cable 31 is wound onto door opening drum 18A. A helical groove (not illustrated) is formed on the surface of door opening drum 18A in order to regulate the position onto which door opening cable 31 is wound. The total length of the helical groove is a little longer than the length necessary for taking up the cable. Door opening drum 18A is coaxial with fourth gear 16D, described later. Door opening drum 18A rotates following fourth gear 16D so that door opening cable 31 can be taken up and payed out. When door opening drum 18A is rotated in door opening direction D1 by the driving force of motor 13, door opening cable 31 is pulled and taken up onto door opening drum 18A. More specifically, the portion of door opening cable 31 inside lower rail 5 is pulled in the vehicle frontward direction, and the portion of door opening cable 31 outside lower rail 5 is pulled in the vehicle rearward direction. Thus, sliding door 2 is moved in the vehicle rearward direction and sliding door 2 is opened.

Door closing drum 18B is constructed in the same manner as door opening drum 18A. Second end 32B of door closing cable 32 is fixed to door closing drum 18B, and door closing cable 32 is wound onto closing drum 18B. Door closing drum 18B is coaxial with fifth gear 16E, described later. Door closing drum 18B rotates following fifth gear 16E so that door closing cable 32 can be taken up and payed out. When motor 13 rotates in the direction opposite to the direction of opening the door and door closing drum 18B is thereby rotated in door closing direction D2, door closing cable 32 is pulled and taken up onto door closing drum 18B. More specifically, the portion of door closing cable 32 inside lower rail 5 is pulled in the vehicle rearward direction, and the portion of door opening cable 31 outside lower rail 5 is pulled in the vehicle frontward direction. Thus, sliding door 2 is moved in the vehicle frontward direction and sliding door 2 is closed.

When the door is opened, since fifth gear 16E rotates in the direction opposite to the direction of closing the door (the direction opposite to door closing direction D2), door closing cable 32 is pulled and payed out from door closing drum 18B. Similarly, when the door is closed, since third gear 16C rotates in the direction opposite to the direction of opening the door (the direction opposite to door opening direction D1), door opening cable 31 is pulled and payed out from door closing drum 18A.

First spring 17A is accommodated in door opening drum 18A coaxially with door opening drum 18A. Respective ends of first spring 17A are fixed to door opening drum 18A and lower housing 15B. First spring 17A biases door opening cable 31 in the direction of winding door opening cable 31 onto door opening drum 18A. In the door closing operation, door opening cable 31 is payed out from door opening cable 31 by the tension that is received from sliding door 2 that is moving and from door opening drum 18A that is rotating but may lose tension and loosen when the door closing operation is completed. If the next door opening operation is conducted on loosened door opening cable 31, a time lag will occur before tension is applied to door opening cable 31, and this time lag will adversely affect operability. Since door opening cable 31 is wound onto door opening drum 18A without loosening due to the tension of first spring 17A, such a time lag can be avoided. Second spring 17B is accommodated in door closing drum 18B. Respective ends of second spring 17B are fixed to door closing drum 18B and lower housing 15B. Second spring 17B biases door dosing cable 32 in the direction of winding door closing cable 32 onto door closing drum 18B. Second spring 17B operates in the same manner as first spring 17A. Since door closing cable 32 is wound onto door closing drum 18B without loosening due to the tension of second spring 17B, a time lag in the next door closing operation can be avoided.

Motor 13 is preferably flat brushless motor 13. Therefore, motor 13 has long life and high mechanical efficiency. Since there is no sliding of brushes when electric current flows, motor 13 does not generate any sliding noise and operation noise is negligible. Further, since no sparks are generated by sliding of brushes, EMC noise is negligible. In addition, the thickness of motor 13 can be reduced due to the brushless arrangement. The ratio of the diameter to the axial thickness of motor 13 is about 4 to 5. A brushless motor generates holding torque even when it is not operating, and thus the position of sliding door 2 can be held even if the vehicle is on a gentle slope. Therefore, there is no need to provide a clutch to hold sliding door 2, and the size and the thickness of driving portion 10 can thus be reduced. When sliding door 2 requires strong braking power, in particular when there is an object between sliding door 2 and the vehicle body mainly in a door closing operation, motor 13, through the action of forced braking, can provide strong braking power. Motor 13 may also be a brushed motor.

Reduction gears 16 reduce the rotation speed of motor 13. Reduction gears 16 are connected to motor 13, door opening drum 18A and door closing drum 18B and transmit the reduced rotation of motor 13 to door opening drum 18A and door closing drum 18B. Reduction gears 16 include first to fifth gears 16A to 16E. First gear 16A is connected to output axis 13A of motor 13 such that first gear 16A cannot rotate relative to output axis 13A. First gear 16A, fourth gear 16D, and output axis 13A of motor 13 share first rotation axis C1 together with door opening drum 18A. Second gear 16B and third gear 16C share third rotation axis C3. Fifth gear 16E and door closing drum 18B share second rotation axis C2. Second gear 16B engages first gear 16A and has a larger number of teeth than first gear 16A. Thus, first gear 16A and second gear 16B constitute first-stage reduction part 16F that reduces the rotation of motor 13. Third gear 16C is formed coaxially with and integrated with second gear 16B. That is, third gear 16C rotates at the same rotation rate and at the same phase as second gear 16B. Third gear 16C has a smaller number of teeth than second gear 16B. Fourth gear 16D engages with third gear 16C and has a larger number of teeth than third gear 16C. Fifth gear 16E engages with third gear 16C and has a larger number of teeth than third gear 16C. Thus, third to fifth gears 16C to 16E constitute second-stage reduction part 16G that reduces the rotation of motor 13. Fourth gear 16D preferably has the same number of teeth as fifth gear 16E. Bearings (not illustrated) are provided in the central bores of fourth gear 16D and fifth gear 16E. Fourth gear 16D and fifth gear 16E are rotatably supported by lower housing 15B via the bearings.

Control device 14 is an ECU (Electric Control Unit) that controls motor 13. ECU has an inverter circuit that controls motor 13. The ECU is thin and box-shaped. Power supply voyage and sensor signals are supplied to the ECU via a harness (not illustrated).

Driving portion 10, i.e., motor 13, reduction gears 16, door opening drum 18A, door closing drum 18B, control device 14, and so on are accommodated in housing 15. Housing 15 has upper housing 15A that accommodates reduction gears 16 and control device 14 and lower housing 15B that accommodates door opening drum 18A and door closing drum 18B. Upper housing 15A and lower housing 15B are fixed to each other by bolts (not illustrated), thereby constituting single housing 15. FIG. 10A shows a perspective view of upper housing 15A as seen from above, and FIG. 10B shows a perspective view of upper housing 15A as seen from below. FIG. 11A shows a perspective view of lower housing 15B as seen from above, and FIG. 11B shows a perspective view of lower housing 15B as seen from below. Recess 15C that accommodates control device 14 is formed on the top surface of upper housing 15A, and recess 15D that accommodates reduction gears 16 is formed on the bottom surface of upper housing 15A. Hole 15E through which output axis 13A of motor 13 (first rotation axis C1) penetrates upper housing 15A, and hole 15F through which third rotation axis C3 of second and third gears 16B, 16C penetrates upper housing 15A are formed in upper housing 15A. A pair of recesses 15G that accommodate door opening drum 18A and door closing drum 18B, respectively, are formed in lower housing 15B, and door opening drum 18A and door closing drum 18B are each rotatably accommodated in respective recess 15G. Recesses 15G are each provided with support portions 15H that rotatably support door opening drum 18A and door closing drum 18B, respectively. Support portion 15J that supports third rotation axis C3 of second gear 16B and third gear 16C is provided between the two recesses 15G.

As shown in FIG. 6, motor 13 is provided on the top surface of upper housing 15A such that motor 13 covers control device 14. Bracket 12 is fixed to motor 13, and the top surfaces of motor 13 and bracket 12 are covered by cover member 11. Bracket 12 has a pair of support plates 12A that face the side surface of lower rail 5. Support plate 12A has holes 12B formed therein and is fixed to the side surface of lower rail 5 by means of bolts 12C and nuts 12D (refer to FIG. 5). That is, driving portion 10 is fastened to the side wall of lower rail 5 via bracket 12. Driving portion 10 can be attached from above lower rail 5 whereby driving portion 10 can be easily attached to lower rail 5.

In the present embodiment, in order to limit the dimensions of driving portion 10, especially in the vehicle width direction, door opening drum 18A, door closing drum 18B, reduction gears 16, motor 13, and control device 14 are arranged as follows. First, door opening drum 18A and door closing drum 18B are arranged along lower rail 5 between front end 5B and rear end 5C of lower rail 5. As described above, lower rail 5 curves toward the inside of the vehicle in the front portion but extends linearly and substantially in parallel to the vehicle front-rear direction in the section facing door opening drum 18A and door closing drum 18B. In other words, lower rail 5 extends linearly at least in the section between first rotation axis C1 of door opening drum 18A and second rotation axis C2 of door closing drum 18B. The linear line (hereinafter, referred to as reference linear line L) that connects first rotation axis C1 of door opening drum 18A to second rotation axis C2 of door closing drum 18B as seen from vertical direction Z is substantially in parallel to the vehicle front-rear direction and is also parallel to lower rail 5. Thus, the space for door opening drum 18A and door closing drum 18B can be limited in the vehicle width direction, and the drums can be arranged in the desired space that is depicted by the broken line in FIG. 2. Note that reference linear line L is shown extended for convenience in FIG. 8.

Motor 13 is arranged above door opening drum 18A and door closing drum 18B in vertical direction Z. As seen in vertical direction Z, output axis 13A (first rotation axis C1) of motor 13 is positioned on reference linear line L and at the end of reference linear line L in the present embodiment (refer to FIG. 8). In other words, as seen in the vertical direction Z, first rotation axis C1 of door opening drum 18A, second rotation axis C2 of door closing drum 18B and output axis 13A of motor 13 are arranged on a linear line that is parallel to lower rail 5. Thus, the space required for motor 13 can be reduced in the vehicle width direction.

Reduction gears 16 are provided between motor 13 and each of door opening drum 18A and door dosing drum 18B in vertical direction Z. As seen in the vertical direction Z, all of rotation axes C1 to C3 of first to fifth gears 16A to 16E are positioned on reference linear line L. Thus, the space required for reduction gears 16 can be reduced in the vehicle width direction.

Arranging reduction gears 16 and particularly motor 13 above door opening drum 18A and door closing drum 18B can mitigate the influence of rainwater and the like that intrudes from outside. Door opening cable 31 and door closing cable 32 outside lower rail 5 easily come into contact with water, such as rainwater. Therefore, water that adheres to door opening cable 31 and door closing cable 32 may intrude inside lower rail 5 during a door opening operation or a door closing operation and may then intrude into housing 15. As shown in FIGS. 11A and 11B, lower housing 15B has drain holes 15K at the lowest parts of the portion of lower housing 15B that accommodates door opening drum 18A and door closing drum 18B. Water that intrudes into housing 15 drains from holes 15K, and thus the possibility of motor 13 coming into contact with water can be mitigated. Note that motor 13 and reduction gears 16 may also be arranged below door opening drum 18A and door closing drum 18B.

The position of reduction gears 16 is shifted toward the vehicle front portion relative to output axis 13A of motor 13. As a result, the space on the vehicle rear side of reduction gears 16 is used as the space for control device 14. Thus, control device 14 can be provided on a side of reduction gears 16 in the direction that follows lower rail 5, whereby the space required for control device 14 can be reduced in the vehicle width direction.

The embodiment described above is directed to sliding door 2 on the left side of vehicle 1 but may also be applied in the same manner to a sliding door on the right side. In addition, the present invention may also be applied to a vehicle having a front sliding door (for example, the door on the passenger-seat side).

Although certain preferred embodiments of the present invention have been shown and described in detail, it should be understood that various changes and modifications may be made without departing from the spirit or scope of the appended claims.

LIST OF REFERENCE NUMERALS

1 vehicle
2 sliding door
5 lower rail
7 drive mechanism
10 driving portion
12 bracket
13 motor
14 control device
15 housing
15K hole
16 reduction gears
18A door opening drum
18B door closing drum
31 door opening cable
32 door closing cable
33 door opening pulley
34 door closing pulley
C1 to C3 rotation axis

What is claimed is:

1. A drive mechanism for driving a sliding door, wherein the sliding door can move along a rail that is provided in a lower part of a vehicle, comprising:
    a door opening cable and a door closing cable each having a first end that is fixed to the sliding door; and
    a driving portion to which a second end of the door opening cable and a second end of the door closing cable are fixed, wherein the driving portion drives the door opening cable and the door closing cable,
    wherein the driving portion includes:
        a door opening drum to which the second end of the door opening cable is fixed and onto which the door opening cable is wound;
        a door closing drum to which the second end of the door closing cable is fixed and onto which the door closing cable is wound; and
        a motor that drives the door opening drum and the door closing drum,
    wherein the door opening drum and the door closing drum are arranged along the rail between a front end and a rear end of the rail,
    wherein each of the door opening drum and the door closing drum has a rotation axis that extends in a vertical direction,
    wherein the rail extends linearly in a section between the rotation axis of the door opening drum and the rotation axis of the door closing drum, and a linear line that connects the rotation axis of the door opening drum and the rotation axis of the door closing drum is parallel to the rail as seen in the vertical direction, and wherein a rotation axis of the motor is positioned on the linear line.

2. The drive mechanism according to claim 1, wherein the driving portion further includes reduction gears that reduce rotation speed of the motor, the reduction gears are connected to the motor, the door opening drum, and the door closing drum and transmit reduced rotation of the motor to the door opening drum and the door closing drum, and the motor and the reduction gears are arranged above or below the door opening drum and the door closing drum.

3. The drive mechanism according to claim 2, wherein the motor is a flat brushless motor.

4. The drive mechanism according to claim 2, wherein the reduction gears have a plurality of gears, and rotation axes of the gears are positioned on the linear line.

5. The drive mechanism according to claim 2, wherein the driving portion has a control device that controls the motor, and the control device is positioned on a side of the reduction gears in a direction that follows the rail.

6. The drive mechanism according to claim 1, further comprising a housing that accommodates the driving portion, wherein the housing has a hole at a lowest part of a portion that accommodates the door opening drum and the door closing drum.

7. The drive mechanism according to claim 1, wherein the driving portion is fixed to a side wall of the rail via a bracket.

8. The drive mechanism according to claim 1, further comprising:

a door opening pulley that is provided at a rear end of the rail and that changes a direction of the door opening cable; and a door closing pulley that is provided at a front end of the rail and that changes a direction of the door closing cable, wherein the door opening pulley and the door closing pulley are attached to a top surface of the rail.

* * * * *